US012674431B2

(12) United States Patent
Endo et al.

(10) Patent No.: US 12,674,431 B2
(45) Date of Patent: Jul. 7, 2026

(54) ENGINE

(71) Applicant: MITSUBISHI HEAVY INDUSTRIES ENGINE & TURBOCHARGER, LTD., Sagamihara (JP)

(72) Inventors: Hiroyuki Endo, Sagamihara (JP); Masaki Toda, Sagamihara (JP); Sota Watanabe, Sagamihara (JP); Satoru Murata, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/832,979

(22) PCT Filed: Feb. 3, 2023

(86) PCT No.: PCT/JP2023/003507

§ 371 (c)(1),
(2) Date: Jul. 25, 2024

(87) PCT Pub. No.: WO2023/153322

PCT Pub. Date: Aug. 17, 2023

(65) Prior Publication Data

US 2025/0116246 A1 Apr. 10, 2025

(30) Foreign Application Priority Data

Feb. 9, 2022 (JP) ................................ 2022-018627

(51) Int. Cl.
*F02B 19/00* (2006.01)
*F02B 19/10* (2006.01)
(Continued)

(52) U.S. Cl.
CPC ......... *F02M 37/0017* (2013.01); *F02B 19/10* (2013.01); *F02B 37/00* (2013.01);
(Continued)

(58) Field of Classification Search
CPC .......... F02B 37/00; F02B 19/10; F02B 43/00; F02D 19/0644; F02D 41/0007; F02D 19/0692; F02D 41/3094; F02M 21/0206
See application file for complete search history.

(56) References Cited

U.S. PATENT DOCUMENTS 2,799,255 A * 7/1957 Gehres ............... F02M 21/0269 123/1 R
5,787,864 A * 8/1998 Collier, Jr. ......... F02M 21/0215 123/492

(Continued)

FOREIGN PATENT DOCUMENTS

CN 113614350 A * 11/2021 ........... F02D 35/023
CN 114483387 A 5/2022

(Continued)

OTHER PUBLICATIONS

Japanese Office Action for Japanese Application No. 2022-018627, dated Feb. 24, 2025, with English translation.

(Continued)

*Primary Examiner* — George C Jin
*Assistant Examiner* — Teuta B Holbrook
(74) *Attorney, Agent, or Firm* — Birch, Stewart, Kolasch & Birch, LLP

(57) ABSTRACT

An engine is provided with: an engine body; an intake line connected to a combustion chamber of the engine body; a first fuel line connected to the intake line and configured to supply a first fuel to the intake line; and a second fuel line connected to the intake line at a position downstream of where the first fuel line is connected and configured to supply a second fuel having a lower explosive limit that is lower than that of the first fuel.

7 Claims, 3 Drawing Sheets

(51) Int. Cl.

| | |
|---|---|
| ***F02B 37/00*** | (2006.01) |
| ***F02B 43/00*** | (2006.01) |
| ***F02D 19/08*** | (2006.01) |
| ***F02M 21/02*** | (2006.01) |
| ***F02M 25/00*** | (2006.01) |
| ***F02M 31/20*** | (2006.01) |
| ***F02M 37/00*** | (2006.01) |

(52) U.S. Cl.

CPC .............. *F02B 43/00* (2013.01); *F02D 19/08* (2013.01); *F02M 21/0206* (2013.01); *F02M 21/0209* (2013.01); *F02M 25/00* (2013.01); *F02M 31/20* (2013.01)

(56) References Cited

U.S. PATENT DOCUMENTS

| | | | | |
|---|---|---|---|---|
| 8,322,128 | B2 | 12/2012 | Mitani | |
| 2002/0104518 | A1* | 8/2002 | Keefer | F02M 25/10 123/585 |
| 2008/0098995 | A1 | 5/2008 | Lauper et al. | |
| 2010/0275891 | A1 | 11/2010 | Gruber | |
| 2011/0011354 | A1* | 1/2011 | Dincer | C01B 3/047 123/3 |
| 2011/0108012 | A1* | 5/2011 | Bryant | F02B 19/12 123/568.11 |
| 2011/0166769 | A1* | 7/2011 | Buechler | F02M 21/0239 701/103 |
| 2011/0259290 | A1 | 10/2011 | Michikawauchi et al. | |
| 2012/0004830 | A1* | 1/2012 | Miyagawa | F02M 43/00 701/103 |
| 2013/0220270 | A1* | 8/2013 | Imai | F02M 21/0281 123/294 |
| 2014/0123937 | A1* | 5/2014 | Wickstone | F02M 63/007 123/299 |
| 2016/0363065 | A1 | 12/2016 | Hagiwara et al. | |
| 2018/0283291 | A1* | 10/2018 | Stroup | F02D 41/34 |
| 2022/0056856 | A1* | 2/2022 | Heggen | F02M 21/0215 |
| 2025/0043740 | A1* | 2/2025 | Gerini | F02D 19/0647 |

FOREIGN PATENT DOCUMENTS

| | | | | | |
|---|---|---|---|---|---|
| EP | 3425185 | A1 | * | 1/2019 | F02B 19/12 |
| GB | 2584735 | A | * | 12/2020 | F02B 19/10 |
| JP | 5-321670 | A | | 12/1993 | |
| JP | 5-321671 | A | | 12/1993 | |
| JP | 2005-155528 | A | | 6/2005 | |
| JP | 2008-196360 | A | | 8/2008 | |
| JP | 2009-62936 | A | | 3/2009 | |
| JP | 2009062936 | A | * | 3/2009 | F02M 21/0284 |
| JP | 2009-97421 | A | | 5/2009 | |
| JP | 2009097421 | A | * | 5/2009 | |
| JP | 4682871 | B2 | | 5/2011 | |
| JP | 2016-133110 | A | | 7/2016 | |
| JP | 6362334 | B2 | * | 7/2018 | F02B 23/101 |
| WO | WO 2015/129369 | A1 | | 9/2015 | |
| WO | WO-2020078919 | A1 | * | 4/2020 | |
| WO | WO-2021232076 | A1 | * | 11/2021 | F02B 19/1028 |

OTHER PUBLICATIONS

International Preliminary Report on Patentability and Written Opinion of the International Searching Authority for International Application No. PCT/JP2023/003507, dated Aug. 22, 2024, with an English translation.

International Search Report for International Application No. PCT/JP2023/003507, dated Apr. 4, 2023, with English translation.

"Gases—Explosion and Flammability Concentration Limits," The Engineering ToolBox [online], Dec. 31, 2003, pp. 1-13 (6 pages total), URL: <https://www.engineeringtoolbox.com/explosive-concentration-limits-d_423;html>.

Extended European Search Report for European Application No. 23752787.4, dated Mar. 13, 2025.

* cited by examiner

COMPARATIVE EMBODIMENT

ENGINE

TECHNICAL FIELD

The present disclosure relates to an engine.

The present application claims priority based on Japanese Patent Application No. 2022-018627 filed on Feb. 9, 2022, the entire content of which is incorporated herein by reference.

BACKGROUND ART

In recent years, engines fueled by hydrogen or the like have been proposed for a decarbonized society, and Patent Document 1 discloses a hydrogen engine using a recirculating working gas that can be operated with high thermal efficiency by removing products with low specific heat ratio (e.g., carbon dioxide) generated in a combustion chamber from the recirculating gas.

CITATION LIST

Patent Literature

Patent Document 1: JP4682871B

SUMMARY

Problems to be Solved

The present inventors have studied a new engine that uses two or more types of fuel, and the challenge is to reduce engine damage caused by backfires in such a new engine. The engine described in Patent Document 1 is an engine fueled only by hydrogen, rather than two or more types of fuel, and the findings to solve the above problem are not disclosed.

In view of the above, an object of at least one embodiment of the present disclosure is to provide an engine that can reduce engine damage caused by backfires for engines that uses two or more types of fuel.

Solution to the Problems

In order to achieve the above object, an engine according to at least one embodiment of the present disclosure is provided with: an engine body; an intake line connected to a combustion chamber of the engine body; a first fuel line connected to the intake line and configured to supply a first fuel to the intake line; and a second fuel line connected to the intake line at a position downstream of where the first fuel line is connected and configured to supply a second fuel having a lower explosive limit that is lower than that of the first fuel.

In order to achieve the above object, an engine according to at least one embodiment of the present disclosure is provided with: an engine body including a main combustion chamber and a precombustion chamber communicating with the main combustion chamber; an intake line connected to the main combustion chamber of the engine body; a first fuel line connected to the intake line and configured to supply a first fuel to the intake line; and a second fuel line connected to the precombustion chamber and configured to supply a second fuel having a lower explosive limit that is lower than that of the first fuel to the precombustion chamber.

Advantageous Effects

At least one embodiment of the present disclosure provides an engine that can reduce engine damage caused by backfires for engines that uses two or more types of fuel.

DETAILED DESCRIPTION

Figure 1:
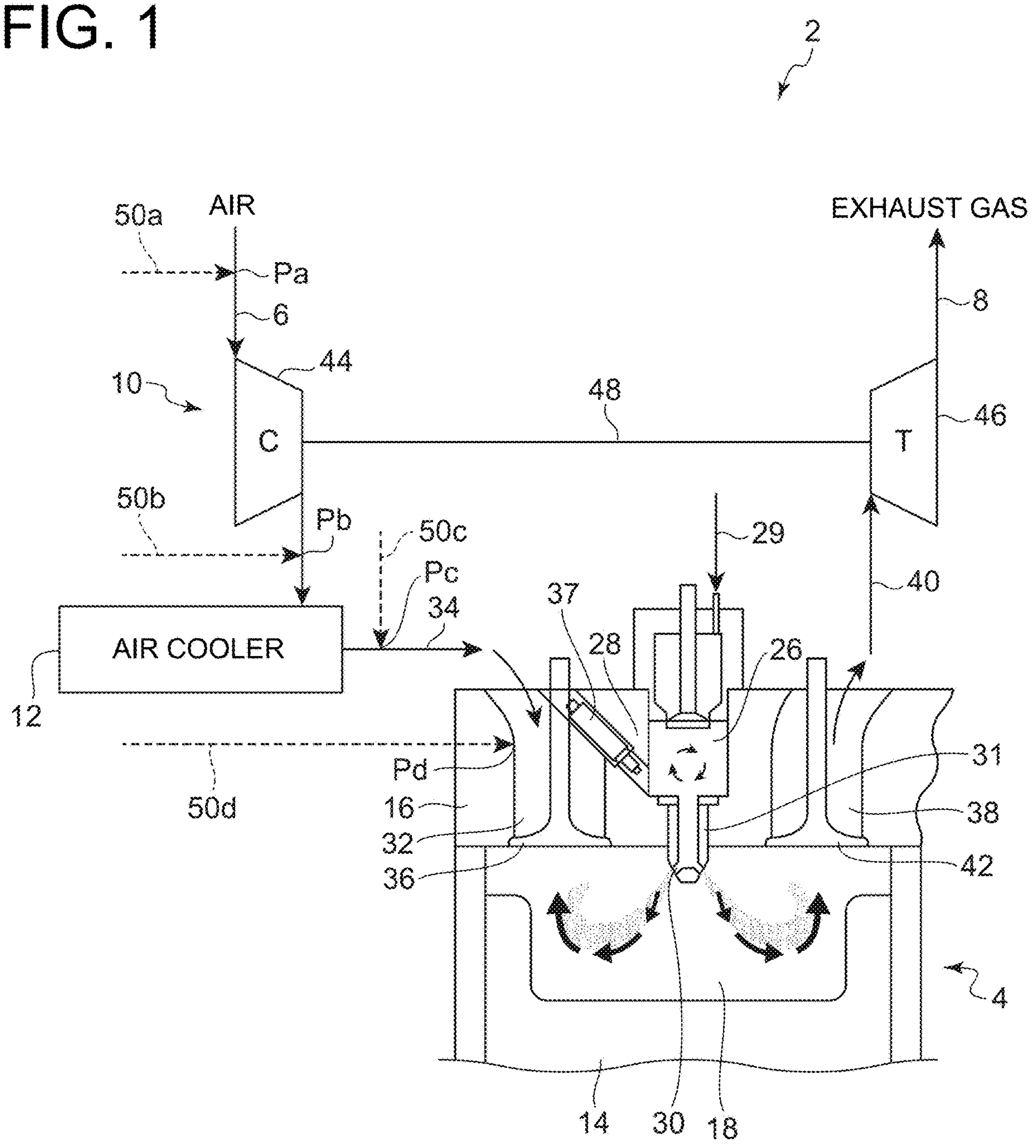
FIG. 1 is a schematic configuration diagram of a gas engine according to some embodiments of the present disclosure.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as “in a direction”, “along a direction”, “parallel”, “orthogonal”, “centered”, “concentric” and “coaxial” shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as “same” “equal” and “uniform” shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as “comprise”, “include”, “have”, “contain” and “constitute” are not intended to be exclusive of other components.

(Schematic Configuration of Gas Engine)

FIG. 1 is a schematic configuration diagram of a gas engine 2 according to some embodiments of the present disclosure.

As shown in FIG. 1, the gas engine 2 is provided with an engine body 4, an intake line 6, an exhaust line 8, a turbocharger 10, and an air cooler 12.

In the example shown in FIG. 1, the gas engine 2 is a precombustion chamber gas engine, and the engine body 4 includes a main combustion chamber 18 (main chamber) defined between a piston 14 and a cylinder head 16, and a precombustion chamber 26 (auxiliary chamber) communicating with the main combustion chamber 18. The precombustion chamber 26 is a space formed inside a precombustion-chamber forming part 28 and a precombustion chamber cap 31 formed in the cylinder head 16 and communicates with the main combustion chamber 18 via a plurality of nozzle holes 30 formed in the precombustion chamber cap 31.

The intake line 6 is connected to the main combustion chamber 18 and is configured to supply a mixture (lean premixture) of at least one type of fuel gas and air to the main combustion chamber 18. The intake line 6 includes an intake port 32 formed in the cylinder head 16 and an intake pipe 34 connected to the intake port 32. One end of the intake port 32 is connected to the main combustion chamber 18, and the other end of the intake port 32 is connected to the intake pipe 34. The intake port 32 is equipped with an intake valve 36 for controlling the connection between the main combustion chamber 18 and the intake pipe 34.

The supply of fuel gas (hereinafter, referred to as precombustion chamber fuel) to the precombustion chamber 26 is directly performed through a precombustion chamber fuel line 29 connected to the precombustion chamber 26. Then, a combustion flame is generated by ignition of the fuel (precombustion chamber fuel and lean premixture flowing from main combustion chamber 18) in the precombustion chamber 26 with an ignition device (in this embodiment, ignition plug 37) disposed in the precombustion-chamber forming part 28. This combustion flame is injected from the precombustion chamber 26 to the main combustion chamber 18 via the plurality of nozzle holes 30, so that the fuel (lean premixture) in the main combustion chamber 18 is combusted.

The exhaust line 8 is connected to the main combustion chamber 18 and is configured to discharge combustion gas generated by combustion of the fuel in the main combustion chamber 18 as exhaust gas from the main combustion chamber 18. The exhaust line 8 includes an exhaust port 38 formed in the cylinder head 16 and an exhaust pipe 40 connected to the exhaust port 38. One end of the exhaust port 38 is connected to the main combustion chamber 18, and the other end of the exhaust port 38 is connected to the exhaust pipe 40. The exhaust port 38 is equipped with an exhaust valve 42 for controlling the connection between the main combustion chamber 18 and the exhaust pipe 40. The intake valve 36 and the exhaust valve 42 open and close the intake port 32 and the exhaust port 38, respectively, depending on the crank angle of the crankshaft (not shown).

The turbocharger 10 includes a compressor 44 disposed in the intake line 6, a turbine 46 disposed in the exhaust line 8, and a rotational shaft 48 connecting the compressor 44 and the turbine 46. When the turbine 46 is driven by exhaust gas flowing through the exhaust line 8, the rotation of the turbine 46 is transmitted to the compressor 44 via the rotational shaft 48, and the compressor 44 compresses air flowing through the intake line 6.

The air cooler 12 is disposed between the compressor 44 and the engine body 4 (between compressor 44 and intake port 32) in the intake line 6 and is configured to cool air that is heated by compression in the compressor 44.

(Configuration Example of Fuel Line of Gas Engine)

In some embodiments, the above-described gas engine 2 may be configured to supply two or more types of fuel gas to the intake line 6. In this case, the gas engine 2 is equipped with two or more of fuel lines 50*a* to 50*d* shown by the dashed lines in FIG. 1.

In FIG. 1, the fuel line 50*a* is connected to the intake line 6 at a position Pa upstream of the compressor 44. The fuel line 50*b* is connected to the intake line 6 at a position Pb downstream of the compressor 44. The position Pb is, in detail, between the compressor 44 and the air cooler 12 in the intake line 6.

The fuel line 50*c* is connected to the intake line 6 at a position Pc downstream of the compressor 44. The position Pb is, in detail, between the air cooler 12 and the cylinder head 16 in the intake line 6. The fuel line 50*d* is connected to the intake line 6 at a position Pd downstream of the compressor 44. The position Pd is, in detail, between the air cooler 12 and the intake valve 36 in the intake line 6, and more specifically, the position of the intake port 32 in the intake line 6.

Some embodiments will be described below, using the case where the gas engine 2 is equipped with two of the fuel lines 50*a* to 50*d*.

In some embodiments described below, of these two fuel lines, the fuel line connected to the intake line 6 at a relatively upstream position is defined as the first fuel line, and the fuel line connected to the intake line 6 at a relatively downstream position (downstream of where the intake line 6 and the first fuel line are connected) is defined as the second fuel line. The fuel gas supplied from the first fuel line to the intake line 6 (i.e., the main component of gas supplied from the first fuel line to the intake line 6) is defined as the first fuel, and the fuel gas supplied from the second fuel line to the intake line 6 (i.e., the main component of gas supplied from the second fuel line to the intake line 6) is defined as the second fuel. The second fuel line is configured to supply the second fuel having a lower explosive limit that is lower than that of the first fuel to the intake line 6. In other words, the lower explosive limit of the second fuel supplied to the intake line 6 from the second fuel line, which is connected to the intake line 6 at a relatively downstream position among the two fuel lines, is lower than the lower explosive limit of the first fuel supplied to the intake line 6 from the first fuel line, which is connected to the intake line 6 at a relatively upstream position.

For example, the gas engine 2 shown in FIG. 1 may have the fuel line 50*a* as the first fuel line and the fuel line 50*b*, fuel line 50*c* or fuel line 50*d* as the second fuel line. That is, the gas engine 2 may have the fuel line 50*a* as the first fuel line and the fuel line 50*b* as the second fuel line, or the fuel line 50*a* as the first fuel line and the fuel line 50*c* as the second fuel line, or the fuel line 50*a* as the first fuel line and the fuel line 50*d* as the second fuel line.

Alternatively, the gas engine 2 shown in FIG. 1 may have the fuel line 50*b* or fuel line 50*c* as the first fuel line, and the fuel line 50*b*, fuel line 50*c*, or fuel line 50*d* that is connected to the intake line 6 at a position downstream of where the first fuel line is connected as the second fuel line. For example, the gas engine 2 may have the fuel line 50*b* as the first fuel line and the fuel line 50*c* as the second fuel line, or the fuel line 50*b* as the first fuel line and the fuel line 50*d* as the second fuel line, or the fuel line 50*c* as the first fuel line and the fuel line 50*d* as the second fuel line.

The first fuel and the second fuel may be any two of hydrogen, methane, propane, n-butane, carbon monoxide, and ammonia, for example. That is, the first fuel may be any of hydrogen, methane, propane, n-butane, carbon monoxide, and ammonia, and the second fuel may be any of hydrogen, methane, propane, n-butane, carbon monoxide, and ammonia with a lower explosive limit that is lower than that of the first fuel. For example, the first fuel may be methane, and the second fuel may be hydrogen. For example, the first fuel may be ammonia, and the second fuel may be methane. The lower explosive limits of hydrogen, methane, propane, n-butane, carbon monoxide, and ammonia are 4.0%, 5.0%, 2.1%, 1.8%, 12.5%, and 15.0%, respectively. The concentration of the first fuel in the gas flowing through the first fuel line and the concentration of the second fuel in the gas flowing through the second fuel line may be, for example, not less than 50% or not less than 80% each.

The technical significance of making the lower explosive limit of the second fuel supplied to the intake line 6 from the second fuel line, which is connected to the intake line 6 at a relatively downstream position, lower than the lower explosive limit of the first fuel supplied to the intake line 6 from the first fuel line, which is connected to the intake line 6 at a relatively upstream position, will now be described.

Since the second fuel, which has a lower explosive limit that is lower than the first fuel, is more likely to cause backfires than the first fuel, by setting the position where the second fuel line is connected to the intake line 6 downstream from the position where the first fuel line is connected to the intake line 6 as described above, in the event of a backfire, the area affected by the backfire in the intake line 6 can be reduced, and damage to the gas engine 2 caused by the backfire can be suppressed (this point will be explained more specifically later).

The pressure in the intake line 6 is lowest at Pa upstream of the compressor 44 and highest at Pb downstream of the compressor. The pressure then drops by the amount of pressure loss at Pc behind the air cooler 12 and Pd in the intake port 32. In other words, there is a relationship Pb>Pc>Pd>Pa. Accordingly, when a fuel line is connected to the intake line 6 at the position Pa, the fuel supply pressure, which is the pressure of fuel flowing through the fuel line, can be lowered, and the energy required to boost the pressure of fuel can be saved. Thus, since the first fuel, which has a relatively high lower explosive limit among the first and second fuels as described above, is less likely to cause backfires, by connecting the first fuel line to the intake line 6 at the position Pa, the energy used to boost the pressure of the first fuel can be saved while reducing the risk of backfires.

The above-described effects will be described specifically in comparison with a comparative embodiment.

Figure 2:
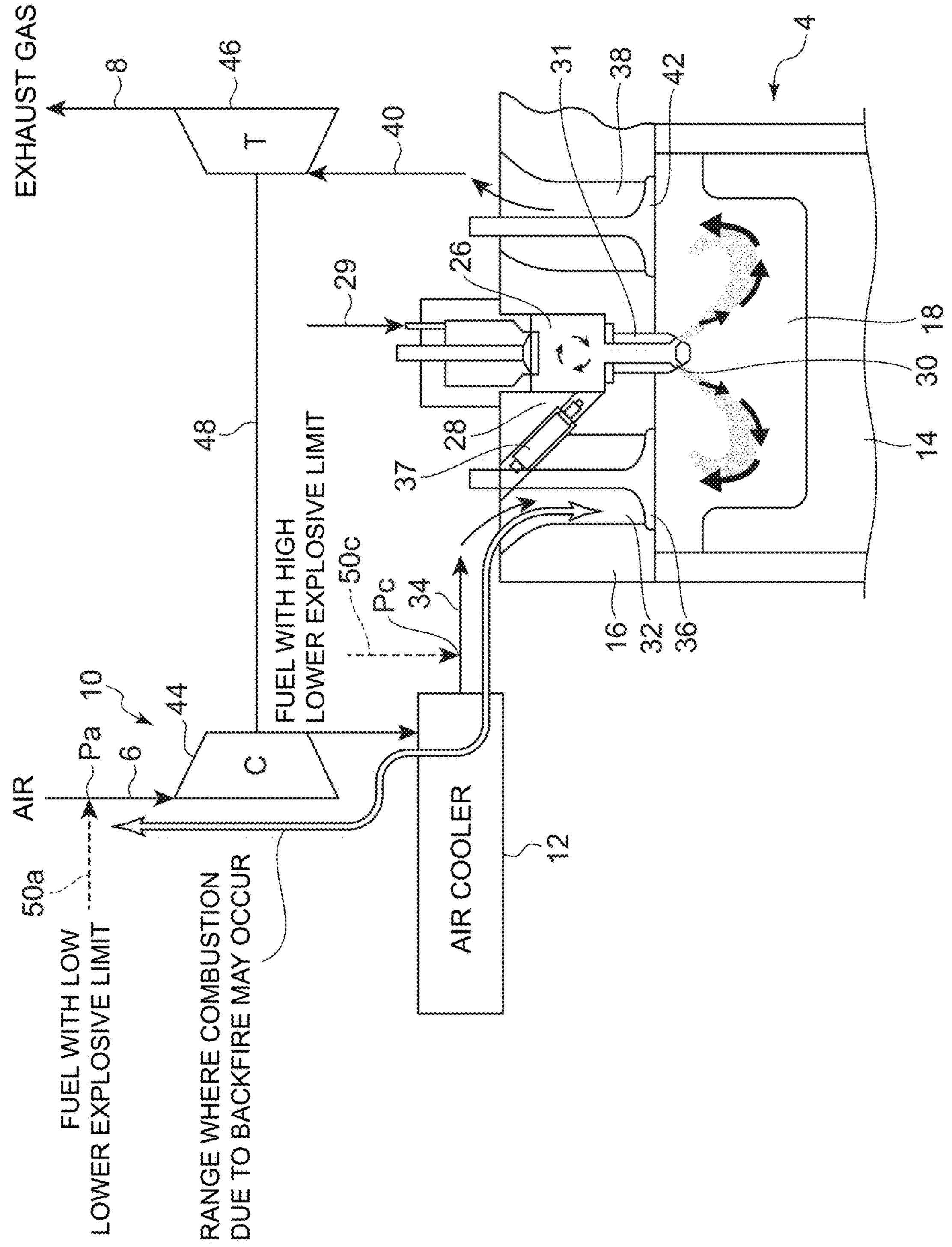
FIG. 2 is a diagram schematically showing the range of influence of backfires in the gas engine according to a comparative embodiment.

As in the comparative embodiment shown in FIG. 2, in the case where a fuel with a low lower explosive limit (e.g., hydrogen) is supplied from, for example, the fuel line 50*a* and a fuel with a high lower explosive limit (e.g., methane) is supplied from, for example, the fuel line 50*c*, if the air-fuel mixture in the intake port 32 is ignited by the hot gas in the main combustion chamber 18 with the opening of the intake valve 36 and the flame travels back upstream to the intake line 6, i.e., a backfire occurs, the backfire may travel back to the position Pa in the intake line 6 where the fuel line 50*a* is connected (the upstream end of the range where the air-fuel mixture containing fuel with low lower explosive limit exists), and due to the large volume to be burned and the widespread effect of backfires, the gas engine is likely to be damaged by backfires.

Figure 3:
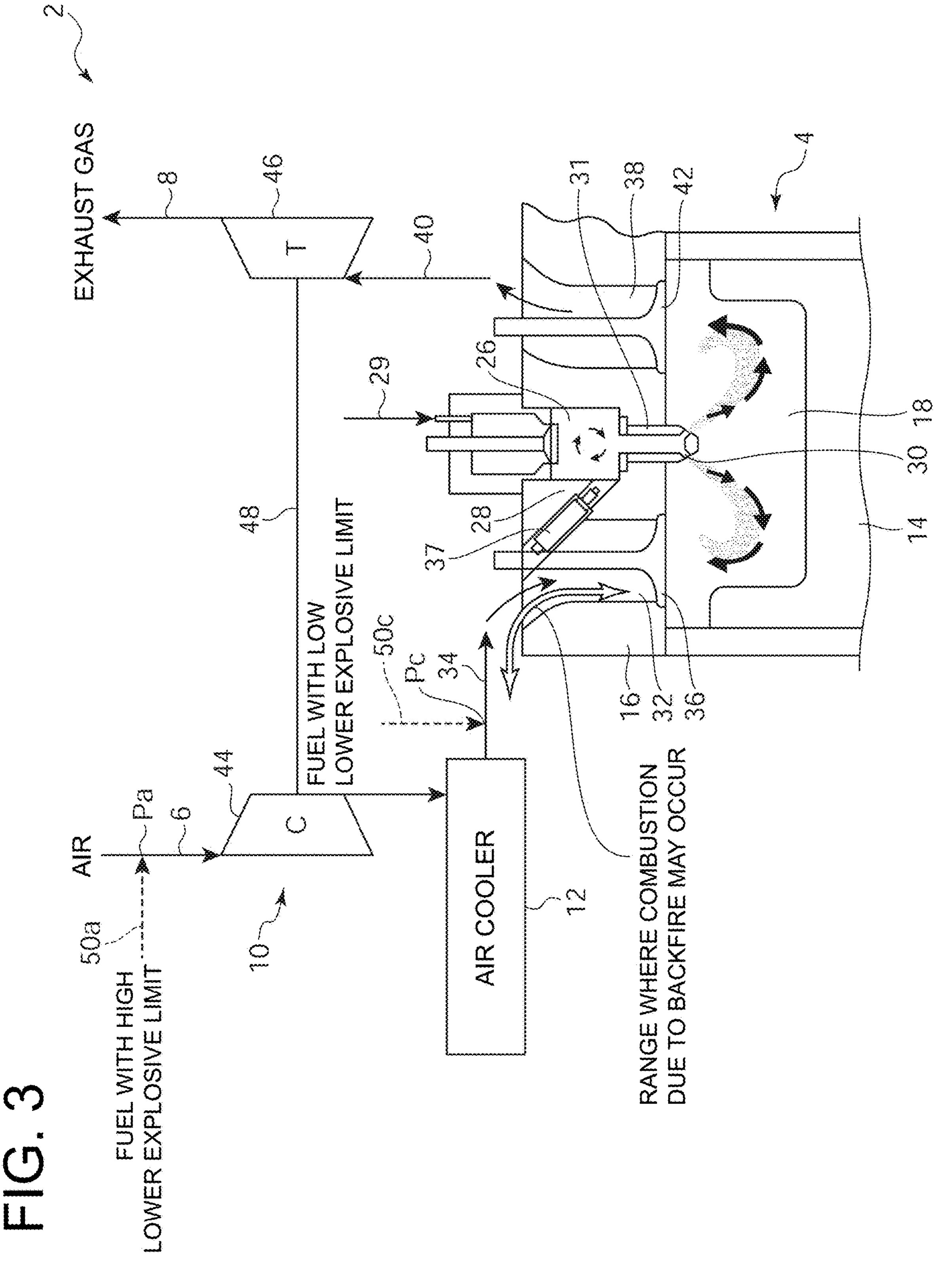
FIG. 3 is a diagram schematically showing an example of the range of influence of backfires in the gas engine.

In contrast, as illustrated in FIG. 3, when a fuel with a high lower explosive limit (e.g., methane) is supplied from, for example, the fuel line 50*a* and a fuel with a low lower explosive limit (e.g., hydrogen) is supplied from, for example, the fuel line 50*c*, even if a backfire occurs, the backfire is unlikely to be traced back upstream from the position Pc in the intake line 6 where the fuel line 50*c* is connected. Therefore, as shown in FIG. 3, the range where combustion due to backfires may occur can be narrower than in the comparative embodiment shown in FIG. 2, and damage to the gas engine 2 due to backfires can be reduced. Further, supplying the fuel from the fuel line 50*c* to the position Pc, which is close to the main combustion chamber 18, increases the response speed of the gas engine 2. Further, since a fuel with a high lower explosive limit (e.g., methane) is less likely to cause backfires, supplying the fuel from the fuel line 50*a* to the upstream position Pa, where the pressure in the intake line 6 is low, can save energy used to boost the pressure of fuel while reducing the risk of backfires.

The following is a description of other effects obtained by the above-described some embodiments.

When the gas engine 2 shown in FIG. 1 has the fuel line 50*a* as the first fuel line and the fuel line 50*b*, fuel line 50*c* or fuel line 50*d* as the second fuel line, the first fuel line is connected to the intake line 6 at a position upstream of the compressor 44, and the second fuel line is connected to the intake line 6 at a position downstream of the compressor 44. This allows the first fuel, which has the higher lower explosive limit (lower risk of backfire) of the first and second fuels, to be supplied to the intake line 6 at the position Pa upstream of the compressor 44, so that the effect of backfires on the compressor 44 can be suppressed compared to when the second fuel is supplied to the intake line 6 at the position Pa upstream of the compressor 44. Additionally, by supplying the first fuel to the intake line 6 at the position Pa with a relatively low pressure before compression by the compressor 44, the fuel supply pressure of the first fuel can be lowered, and the energy required to boost the pressure of the first fuel can be saved. Additionally, by supplying the second fuel, which has the lower lower explosive limit (higher risk of backfire) of the first and second fuels, to the intake line 6 at a position downstream of the compressor 44, the effect of backfires on the compressor 44 can be suppressed, and the risk of damage to the turbocharger 10 can be reduced. It is possible to produce the gas engine 2 according to the present embodiment by modifying an existing engine with a fuel line connected to the intake line 6 at a position upstream of the compressor 44.

When the gas engine 2 shown in FIG. 1 has the fuel line 50*a* as the first fuel line and the fuel line 50*c* or fuel line 50*d* as the second fuel line, the second fuel line is connected to the intake line 6 at a position between the air cooler 12 and the intake valve 36. This allows the second fuel, which has the lower lower explosive limit (higher risk of backfire) of the first and second fuels, to be supplied to the intake line 6 at a position between the air cooler 12 and the intake valve 36, so that even if a backfire occurs, the area affected by the backfire can be limited to the area from the intake valve 36 to the rear of the air cooler 12, and damage to the gas engine 2 can be reduced.

When the gas engine 2 shown in FIG. 1 has the fuel line 50*a* as the first fuel line and the fuel line 50*b* as the second fuel line, the second fuel line is connected to the intake line 6 at a position between the compressor 44 and the air cooler 12. In this case, the second fuel line can be connected to the intake line 6 outside the engine body 4, making it easier to supply fuel from the second fuel line to the intake line 6. Additionally, as described above, even if a backfire occurs, the flame will not travel back to the compressor 44, reducing the risk of damage to the turbocharger 10.

When the gas engine 2 shown in FIG. 1 has the fuel line 50*a* as the first fuel line and the fuel line 50*d* as the second fuel line, the second fuel line is connected to the intake port 32. This suppresses the effect of backfire on the outside of the engine body 4 in the event of a backfire caused by the second fuel and effectively reduces damage to the gas engine 2.

When the gas engine 2 shown in FIG. 1 has the fuel line 50*b* as the first fuel line and the fuel line 50*c* as the second fuel line, or the fuel line 50*b* as the first fuel line and the fuel line 50*d* as the second fuel line, or the fuel line 50*c* as the first fuel line and the fuel line 50*d* as the second fuel line, the first fuel line is connected to the intake line 6 at a position between the compressor 44 and the intake valve 36, and the second fuel line is connected to the intake line 6 at a position downstream of where the first fuel line is connected to the intake line 6. In this case, it is possible to produce the gas engine 2 according to the present embodiment by modifying an existing engine with a fuel line connected to the intake line 6 at a position between the compressor 44 and the intake valve 36.

(Another Configuration Example of Fuel Line of Gas Engine)

In some embodiments, the gas engine 2 shown in FIG. 1 may supply a different fuel to the intake line 6 than the precombustion chamber fuel supplied from the precombustion chamber fuel line 29. In this case, the gas engine 2 may have one or more of the fuel lines 50*a* to 50*d* which have been described with FIG. 1, and the precombustion chamber fuel line 29 may be configured to supply the precombustion chamber 26 with fuel gas having a lower explosive limit that is lower than that of fuel gas supplied from the one or more fuel lines to the intake line 6.

For example, the fuel supplied from the one or more fuel lines of the fuel lines 50*a* to 50*d* to the intake line 6 may be any of hydrogen, methane, propane, n-butane, carbon monoxide, and ammonia. The precombustion chamber fuel supplied from the precombustion chamber fuel line 29 to the precombustion chamber 26 may be any of hydrogen, methane, propane, n-butane, carbon monoxide, and ammonia with a lower explosive limit that is lower than that of the fuel supplied from the one or more fuel lines to the intake line 6. For example, methane may be supplied from the one or more fuel lines of the fuel lines 50*a* to 50*d* to the intake line 6, and hydrogen may be supplied from the precombustion chamber fuel line 29 to the precombustion chamber 26. Alternatively, for example, ammonia may be supplied from the one or more fuel lines of the fuel lines 50*a* to 50*d* to the intake line 6, and methane may be supplied from the precombustion chamber fuel line 29 to the precombustion chamber 26.

In the precombustion chamber gas engine 2 that includes the main combustion chamber 18 and the precombustion chamber 26, there is basically no air in the precombustion chamber fuel line 29 for supplying fuel to the precombustion chamber 26, or if air is present, it is in minute amounts. Therefore, the risk of backfire is small even if a fuel with a lower explosive limit that is lower than that of fuel gas supplied to the intake line 6 and more likely to cause backfires is supplied from the precombustion chamber fuel line 29 to the precombustion chamber 26 as described above. Additionally, as described above, by supplying fuel gas having a higher lower explosive limit than the precombustion chamber fuel and less likely to cause backfires to the intake line 6, the risk of backfire is less likely to occur than when the same fuel gas as the precombustion chamber fuel is supplied to the intake line 6. Thus, it is possible to reduce damage to the gas engine 2 caused by backfires.

Some embodiments will be described below, using the case where the gas engine 2 is equipped with one of the fuel lines 50*a* to 50*d*. In some embodiments described below, one of the fuel lines 50*a* to 50*d* provided by the gas engine 2 corresponds to the first fuel line and the precombustion chamber fuel line 29 corresponds to the second fuel line. Further, fuel gas supplied from one of the fuel lines 50*a* to 50*d* provided by the gas engine 2 to the intake line 6 corresponds to the first fuel, and fuel gas supplied from the precombustion chamber fuel line 29 to the precombustion chamber 26 corresponds to the second fuel.

In some embodiments, the gas engine 2 shown in FIG. 1 may have the fuel line 50*a* as the one fuel line. In this case, the precombustion chamber fuel line 29 is configured to supply the precombustion chamber 26 with fuel gas having a lower explosive limit that is lower than that of fuel gas supplied from the fuel line 50*a* to the intake line 6. Thus, it is possible to reduce damage to the gas engine 2 caused by backfires as described above. Additionally, by supplying the fuel gas having a higher lower explosive limit (lower risk of backfire) than the precombustion chamber fuel to the intake line 6 at a position upstream of the compressor 44, the effect of backfire on the compressor 44 can be suppressed compared to when the same fuel as the precombustion chamber fuel is supplied at a position upstream of the compressor 44. Additionally, by supplying the fuel gas to the intake line 6 at the position Pa with a relatively low pressure before compression by the compressor 44, the fuel supply pressure of the fuel gas can be lowered, and the energy required to boost the pressure of the fuel gas can be saved.

In some embodiments, the gas engine 2 shown in FIG. 1 may have any one of the fuel lines 50*b* to 50*d* as the one fuel line. In this case, the precombustion chamber fuel line 29 is configured to supply the precombustion chamber 26 with fuel gas having a lower explosive limit that is lower than that of fuel gas supplied from any one of the fuel lines 50*b* to 50*d* provided by the gas engine 2 to the intake line 6.

Thus, it is possible to reduce damage to the gas engine 2 caused by backfires as described above. Additionally, by supplying the fuel gas having a higher lower explosive limit (lower risk of backfire) than the precombustion chamber fuel to the intake line 6 at a position downstream of the compressor 44, the effect of backfires on the compressor 44 can be effectively suppressed, and the risk of damage to the turbocharger 10 can be effectively reduced. It is possible to produce the gas engine 2 by modifying an existing engine with a fuel line connected to the intake line 6 at a position downstream of the compressor 44.

In some embodiments, the gas engine 2 shown in FIG. 1 may have the fuel line 50*b* as the one fuel line. In this case, the precombustion chamber fuel line 29 is configured to supply the precombustion chamber 26 with fuel gas having a lower explosive limit that is lower than that of fuel gas supplied from the fuel line 50*b* to the intake line 6. In this case, the fuel line 50*b* can be connected to the intake line 6 outside the engine body 4, making it easier to supply fuel from the fuel line 50*b* to the intake line 6. Additionally, as described above, even if a backfire occurs, the flame will not travel back to the compressor 44, reducing the risk of damage to the turbocharger 10.

In some embodiments, the gas engine 2 shown in FIG. 1 may have the fuel line 50*c* or 50*d* as the one fuel line. In this case, the precombustion chamber fuel line 29 is configured to supply the precombustion chamber 26 with fuel gas having a lower explosive limit that is lower than that of fuel gas supplied from the fuel line 50*c* or 50*d* to the intake line 6. Thereby, even if a backfire occurs, the area affected by the backfire can be limited to the area from the intake valve 36 to the rear of the air cooler 12, and damage to the gas engine 2 can be reduced.

In some embodiments, the gas engine 2 shown in FIG. 1 may have the fuel line 50*d* as the one fuel line. In this case, the precombustion chamber fuel line 29 is configured to supply the precombustion chamber 26 with fuel gas having a lower explosive limit that is lower than that of fuel gas supplied from the fuel line 50*d* to the intake line 6. This suppresses the effect of backfire on the outside of the engine body 4 in the event of a backfire caused by the fuel gas supplied to the intake line 6 and effectively reduces damage to the gas engine 2.

The present disclosure is not limited to the embodiments described above, but includes modifications to the embodiments described above, and embodiments composed of combinations of those embodiments.

For example, the gas engine may supply three or more types of fuel gas to the intake line 6. In this case, for three or more types of fuel, the lower the lower explosive limit, the further downstream the position where the fuel is supplied to the intake line 6. For example, the gas engine may have a first fuel line connected to the intake line and configured to supply the first fuel to the intake line, a second fuel line connected to the intake line at a position downstream of where the first fuel line is connected and configured to supply the second fuel to the intake line, and a third fuel line connected to the intake line at a position downstream of where the second fuel line is connected and configured to supply the third fuel to the intake line. In this case, the lower explosive limit of the second fuel may be lower than that of the first fuel, and the lower explosive limit of the third fuel may be lower than that of the second fuel. Thus, damage to the gas engine 2 caused by backfires can be reduced, and the energy used to boost the pressure of fuel can be saved.

The gas engine does not have to be a precombustion chamber gas engine, and the gas engine does not have to have a precombustion chamber. In this case, for example, the gas engine may have an intake line connected to the combustion chamber of the engine body, a first fuel line connected to the intake line, and a second fuel line connected to the combustion chamber. In this case, the second fuel line may supply the combustion chamber with the second fuel having a lower explosive limit that is lower than that of the first fuel supplied from the first fuel line to the intake line. Thus, it is possible to reduce damage to the gas engine 2 caused by backfires.

The present disclosure is not limited to gas engines, but can also be applied to diesel engines, for example. The "lower explosive limit" described above may be read as "lower limit of combustible range" or "lower limit of combustion range". Also, "low lower explosive limit" can be read as "high explosive grade". The higher explosive grade takes precedence over the lower lower explosive limit. If the explosive grade is the same, the judgment is made by the lower explosive limit.

The contents described in the above embodiments would be understood as follows, for instance.

(1) An engine (e.g., the above-described gas engine 2) according to at least one embodiment of the present disclosure is provided with: an engine body (e.g., the above-described engine body 4); an intake line (e.g., the above-described intake line 6) connected to a combustion chamber (e.g., the above-described main combustion chamber 18) of the engine body; a first fuel line (e.g., any of the above-described fuel lines 50*a* to 50*d*) connected to the intake line and configured to supply a first fuel (e.g., any of the above-described hydrogen, methane, propane, n-butane, carbon monoxide, and ammonia) to the intake line; and a second fuel line connected to the intake line at a position downstream of where the first fuel line is connected (e.g., any of the above-described fuel lines 50*a* to 50*d* connected to the intake line at a position downstream of where the first fuel line is connected) and configured to supply a second fuel having a lower explosive limit that is lower than that of the first fuel (e.g., any of the above-described hydrogen, methane, propane, n-butane, carbon monoxide, and ammonia having a lower explosive limit that is lower than that of the first fuel).

Since the second fuel, which has a lower explosive limit that is lower than the first fuel, is more likely to cause backfires than the first fuel, by setting the position where the second fuel line is connected to the intake line downstream from the position where the first fuel line is connected to the intake line as described in (1), in the event of a backfire, the area affected by the backfire in the intake line can be reduced, and damage to the engine caused by the backfire can be suppressed.

In addition, since the first fuel, which has a relatively high lower explosive limit among the first and second fuels as described in (1), is less likely to cause backfires, even if the first fuel line is connected to the intake line at a position upstream of where the second fuel line is connected to the intake line, the increased risk of backfires can be controlled.

(2) In some embodiments, in the engine described in the above (1), the engine is further provided with a turbocharger (e.g., the above-described turbocharger 10) including a compressor (e.g., the above-described compressor 44) for compressing air flowing through the intake line. The first fuel line (e.g., the above-described fuel line 50*a*) is connected to the intake line at a position (e.g., the above-described position Pa) upstream of the compressor, and the second fuel line (e.g., the above-described fuel line 50*b*, fuel line 50*c*, or fuel line 50*d*) is connected to the intake line at a position (e.g., the above-described position Pb, position Pc, or position Pd) downstream of the compressor.

With the engine described in (2), by supplying the first fuel, which has the higher lower explosive limit (lower risk of backfire) of the first and second fuels, to the intake line at a position upstream of the compressor, the effect of backfires on the compressor can be suppressed. Additionally, by supplying the first fuel to the intake line at the position with a relatively low pressure before compression by the compressor, the fuel supply pressure of the first fuel can be lowered, and the energy required to boost the pressure of the first fuel can be saved.

Additionally, by supplying the second fuel, which has the lower lower explosive limit (higher risk of backfire) of the first and second fuels, to the intake line at a position downstream of the compressor, the effect of backfires on the compressor can be suppressed, and the risk of damage to the turbocharger can be reduced.

It is possible to produce the engine by modifying an existing engine with a fuel line connected to the intake line at a position upstream of the compressor.

(3) In some embodiments, in the engine described in the above (2), the engine is further provided with an air cooler (e.g., the above-described air cooler 12) disposed between the compressor and the engine body in the intake line. The second fuel line is connected to the intake line at a position between the air cooler and an intake valve (e.g., the above-described intake valve 36) of the engine body.

With the engine described in (3), even if a backfire occurs, the area affected by the backfire can be limited to the area from the intake valve to the rear of the air cooler, and damage to the engine can be reduced.

(4) In some embodiments, in the engine described in the above (2), the engine is further provided with an air cooler (e.g., the above-described air cooler 12) disposed between the compressor and the engine body in the intake line. The second fuel line (e.g., the above-described fuel line 50*b*) is connected to the intake line at a position (e.g., the above-described position Pb) between the compressor and the air cooler.

With the engine described in (4), since the position between the compressor and the air cooler in the intake line is outside the engine body, fuel can be easily supplied from the second fuel line to the intake line. Additionally, even if a backfire occurs, the flame will not travel back to the compressor, reducing the risk of damage to the turbocharger.

(5) In some embodiments, in the engine described in any one of the above (1) to (3), the second fuel line (e.g., the above-described fuel line 50*d*) is connected to an intake port (e.g., the above-described intake port 32) formed in a cylinder head of the engine body.

With the engine described in (5), it is possible to suppress the effect of backfire on the outside of the engine body in the event of a backfire and effectively reduce damage to the engine.

(6) In some embodiments, in the engine described in the above (1), the engine is further provided with a turbocharger (e.g., the above-described turbocharger 10) including a compressor (e.g., the above-described compressor 44) for compressing air flowing through the intake line. The first fuel line (e.g., the above-described fuel line 50*b*, fuel line 50*c*, or fuel line 50*d*) is connected to the intake line at a position between the compressor and an intake valve (e.g., the above-described intake valve 36) of the engine body. The second fuel line (fuel line 50*b*, fuel line 50*c*, or fuel line 50*d* that is connected to the intake line at a position downstream of where the first fuel line is connected to the intake line 6) is connected to the intake line at a position downstream of where the first fuel line is connected.

With the engine described in (6), it is possible to easily produce the engine when modifying an existing engine with a fuel line connected to the intake line at a position between the compressor and the intake valve of the engine body.

(7) An engine according to at least one embodiment of the present disclosure is provided with: an engine body (e.g., the above-described engine body 4) including a main combustion chamber (e.g., the above-described main combustion chamber 18) and a precombustion chamber (e.g., the above-described precombustion chamber 26) communicating with the main combustion chamber; an intake line (e.g., the above-described intake line 6) connected to the main combustion chamber of the engine body; a first fuel line (e.g., the above-described any of the above-described fuel lines 50*a* to 50*d*) connected to the intake line and configured to supply a first fuel (e.g., any of the above-described hydrogen, methane, propane, n-butane, carbon monoxide, and ammonia) to the intake line; and a second fuel line (e.g., the above-described precombustion chamber fuel line 29) connected to the precombustion chamber and configured to supply a second fuel having a lower explosive limit that is lower than that of the first fuel to the precombustion chamber.

In the so-called precombustion chamber engine that includes a main combustion chamber and a precombustion chamber, there is basically no air in the line for supplying fuel to the precombustion chamber, or if air is present, it is in minute amounts. Therefore, the risk of backfire is small even if the second fuel with a lower explosive limit that is lower than that of the first fuel and more likely to cause backfires is supplied from the second fuel line to the precombustion chamber as described in (7).

Additionally, as described in (7), by supplying the first fuel having a higher lower explosive limit than the second fuel and less likely to cause backfires to the intake line, the risk of backfire is less likely to occur than when the second fuel, which is likely to cause backfires, is supplied to the intake line.

Thus, it is possible to reduce damage to the engine caused by backfires.

(8) In some embodiments, in the engine described in the above (7), the engine is further provided with a turbocharger (e.g., the above-described turbocharger 10) including a compressor (e.g., the above-described compressor 44) for compressing air flowing through the intake line. The first fuel line (e.g., the above-described fuel line 50*a*) is connected to the intake line at a position (e.g., the above-described position Pa) upstream of the compressor.

With the engine described in (8), by supplying the first fuel, which has the higher lower explosive limit (lower risk of backfire) of the first and second fuels, to the intake line at a position upstream of the compressor, the effect of backfires on the compressor can be suppressed. Additionally, by supplying the first fuel to the intake line at the position with a relatively low pressure before compression by the compressor, the fuel supply pressure of the first fuel can be lowered, and the energy required to boost the pressure of the first fuel can be saved.

It is possible to produce the engine by modifying an existing engine with a fuel line connected to the intake line at a position upstream of the compressor.

(9) In some embodiments, in the engine described in the above (7), the engine is further provided with a turbocharger (e.g., the above-described turbocharger 10) including a compressor (e.g., the above-described compressor 44) for compressing air flowing through the intake line. The first fuel line (e.g., any of the above-described fuel lines 50*b* to 50*d*) is connected to the intake line at a position (e.g., the above-described position Pb, Pc, or Pd) downstream of the compressor.

With the engine described in (9), by supplying the first fuel, which has the higher lower explosive limit (lower risk of backfire) of the first and second fuels, to the intake line at a position downstream of the compressor, the effect of backfires on the compressor can be effectively suppressed, and the risk of damage to the turbocharger can be effectively reduced. It is possible to produce the engine by modifying an existing engine with a fuel line connected to the intake line at a position downstream of the compressor.

(10) In some embodiments, in the engine described in the above (9), the engine is further provided with an air cooler (e.g., the above-described air cooler 12) disposed between the compressor and the engine body in the intake line. The first fuel line is connected to the intake line at a position (e.g., the above-described position Pb) between the compressor and the air cooler.

With the engine described in (10), since the position between the compressor and the air cooler in the intake line is outside the engine body, fuel can be easily supplied from the first fuel line to the intake line. Additionally, even if a backfire occurs, the flame will not travel back to the compressor, reducing the risk of damage to the turbocharger.

(11) In some embodiments, in the engine described in the above (9), the engine is further provided with an air cooler (e.g., the above-described air cooler 12) disposed between the compressor and the engine body in the intake line. The first fuel line (e.g., the above-described fuel line 50*d*) is connected to an intake port (e.g., the above-described intake port 32) formed in a cylinder head of the engine body.

With the engine described in (11), it is possible to suppress the effect of backfire on the outside of the engine body in the event of a backfire caused by the second fuel and effectively reduce damage to the engine.

(12) In some embodiments, in the engine described in any one of the above (1) to (11), the first fuel is methane, and the second fuel is hydrogen.

With the engine described in (12), carbon dioxide emissions can be reduced by using hydrogen compared to conventional engines that use only methane as fuel. Hydrogen has a lower lower explosive limit and a higher combustion rate than methane, but supplying hydrogen at a position less affected by a possible backfire than methane reduces engine damage caused by hydrogen-induced backfires.

(13) In some embodiments, in the engine described in any one of the above (1) to (11), the first fuel is ammonia, and the second fuel is methane.

With the engine described in (13), carbon dioxide emissions can be reduced by using ammonia compared to conventional engines that use only methane as fuel. Since ammonia has a higher lower explosive limit and a lower combustion rate than methane, the risk of backfires does not increase even if ammonia is supplied as far upstream as possible in the intake line. When the ammonia fuel input position is Pa upstream of the compressor 44, the energy used to boost the pressure of the first fuel can be saved.

(14) In some embodiments, in the engine described in any one of the above (1) to (11), the first fuel is ammonia, and the second fuel is hydrogen.

With the engine described in (14), carbon dioxide emissions can be reduced by using ammonia and hydrogen compared to conventional engines that use only methane as fuel. Since ammonia has a higher lower explosive limit and a lower combustion rate than methane, the risk of backfires does not increase even if ammonia is supplied as far upstream as possible in the intake line. When the ammonia fuel input position is Pa upstream of the compressor 44, the energy used to boost the pressure of the first fuel can be saved. Since ammonia is difficult to ignite on its own, the use of hydrogen as the second fuel improves ignition.

REFERENCE SIGNS LIST

2 Gas engine
4 Engine body
6 Intake line
8 Exhaust line
10 Supercharger
12 Air cooler
14 Piston
16 Cylinder head
18 Main combustion chamber
26 Precombustion chamber
28 Precombustion-chamber forming part
29 Precombustion chamber fuel line
30 Nozzle hole
31 Precombustion chamber cap
32 Intake port
34 Intake pipe
36 Intake valve
37 Ignition plug
38 Exhaust port
40 Exhaust pipe
42 Exhaust valve
44 Compressor
46 Turbine
48 Rotational shaft
**50*a*, 50*b*, 50*c*, 50*d*** Fuel line
Pb, Pc, Pd Position

The invention claimed is:

1. An engine, comprising:

an engine body including a main combustion chamber;

an intake line connected to a combustion chamber of the engine body, the intake line including an intake port formed in a cylinder head of the engine body, the intake port having one end connected to the main combustion chamber, and an intake pipe connected to the other end of the intake port;

a first fuel line connected to the intake line and configured to supply a first fuel to the intake line; and a second fuel line connected to the intake line at a position downstream of where the first fuel line is connected and configured to supply a second fuel having a lower explosive limit that is lower than that of the first fuel;

a turbocharger including a compressor for compressing air flowing through the intake line; and an air cooler disposed between the compressor and the engine body in the intake line, wherein the first fuel line is connected to the intake line at a position upstream of the compressor, wherein the second fuel line is connected to the intake line at a position downstream of the compressor, wherein the second fuel line is connected directly to the intake port of the intake line at a position between the air cooler and an intake valve of the engine body to supply the second fuel directly into the intake port;

wherein the first fuel is methane, and wherein the second fuel is hydrogen.

2. An engine, comprising:

an engine body including a main combustion chamber and a precombustion chamber communicating with the main combustion chamber;

an intake line connected to the main combustion chamber of the engine body, the intake line including an intake port formed in a cylinder head of the engine body, the intake port having one end connected to the main combustion chamber, and an intake pipe connected to the other end of the intake port;

at least one fuel line connected to the intake line and configured to supply a first fuel to the intake line; and a precombustion chamber fuel line connected to the precombustion chamber and configured to supply a second fuel having a lower explosive limit that is lower than that of the first fuel to the precombustion chamber;

a turbocharger including a compressor for compressing air flowing through the intake line;

and an air cooler disposed between the compressor and the engine body in the intake line, wherein the at least one fuel line is connected to the intake line at a position downstream of the compressor, and wherein the at least one fuel line is connected directly to the intake port of the intake line at a position between the air cooler and an intake valve of the engine body to supply the first fuel directly into the intake port.

3. The engine according to claim 2, wherein the first fuel is methane, and wherein the second fuel is hydrogen.

4. The engine according to claim 2, wherein the first fuel is ammonia, and wherein the second fuel is methane.

5. The engine according to claim 2, wherein the first fuel is ammonia, and wherein the second fuel is hydrogen.

6. An engine, comprising:

an engine body including a main combustion chamber;

an intake line connected to a combustion chamber of the engine body, the intake line including an intake port formed in a cylinder head of the engine body, the intake port having one end connected to the main combustion chamber, and an intake pipe connected to the other end of the intake port;

a first fuel line connected to the intake line and configured to supply a first fuel to the intake line; and a second fuel line connected to the intake line at a position downstream of where the first fuel line is connected and configured to supply a second fuel having a lower explosive limit that is lower than that of the first fuel;

a turbocharger including a compressor for compressing air flowing through the intake line; and an air cooler disposed between the compressor and the engine body in the intake line, wherein the first fuel line is connected to the intake line at a position upstream of the compressor, wherein the second fuel line is connected to the intake line at a position downstream of the compressor, wherein the second fuel line is connected directly to the intake port of the intake line at a position between the air cooler and an intake valve of the engine body to supply the second fuel directly into the intake port;

wherein the first fuel is ammonia, and wherein the second fuel is methane.

7. An engine, comprising:

an engine body including a main combustion chamber;

an intake line connected to a combustion chamber of the engine body, the intake line including an intake port formed in a cylinder head of the engine body, the intake port having one end connected to the main combustion chamber, and an intake pipe connected to the other end of the intake port;

a first fuel line connected to the intake line and configured to supply a first fuel to the intake line; and a second fuel line connected to the intake line at a position downstream of where the first fuel line is connected and configured to supply a second fuel having a lower explosive limit that is lower than that of the first fuel;

a turbocharger including a compressor for compressing air flowing through the intake line; and an air cooler disposed between the compressor and the engine body in the intake line, wherein the first fuel line is connected to the intake line at a position upstream of the compressor, wherein the second fuel line is connected to the intake line at a position downstream of the compressor, wherein the second fuel line is connected directly to the intake port of the intake line at a position between the air cooler and an intake valve of the engine body to supply the second fuel directly into the intake port;

wherein the first fuel is ammonia, and wherein the second fuel is hydrogen.

* * * * *